United States Patent

Güntherberg et al.

[11] Patent Number: 6,162,867
[45] Date of Patent: Dec. 19, 2000

[54] THERMOPLASTIC MOULDING COMPOUNDS

[75] Inventors: Norbert Güntherberg, Speyer; Konrad Knoll, Ludwigshafen; Martin Weber, Maikammer; Gerhard Lindenschmidt, Leimen, all of Germany

[73] Assignee: BASF Aktiengesellschaft, Ludwigshafen, Germany

[21] Appl. No.: 09/254,916

[22] PCT Filed: Sep. 9, 1997

[86] PCT No.: PCT/EP97/04912

§ 371 Date: Mar. 17, 1999

§ 102(e) Date: Mar. 17, 1999

[87] PCT Pub. No.: WO98/12256

PCT Pub. Date: Mar. 26, 1998

[30] Foreign Application Priority Data

Sep. 19, 1996 [DE] Germany .............. 196 38 255

[51] Int. Cl.$^7$ ...................................... C08L 53/02
[52] U.S. Cl. ............................. 525/71; 525/902
[58] Field of Search ...................... 525/71, 902

[56] References Cited

U.S. PATENT DOCUMENTS 5,134,199  7/1992  Hattori et al. ........................ 525/314
5,250,617  10/1993  Piejko et al. ............................ 525/85

FOREIGN PATENT DOCUMENTS 2193264  12/1995  Canada .
2160952  4/1996  Canada .

*Primary Examiner*—Rachel Gorr
*Attorney, Agent, or Firm*—Keil & Weinkauf

[57] ABSTRACT

The invention relates to thermoplastic molding compositions comprising

A) from 30 to 98% by weight of a graft copolymer comprising
  $a_K$) from 30 to 90% by weight of an elastomeric graft core,
  $a_S$) from 10 to 70% by weight of a graft shell comprising
    $a_S/1$) from 50 to 100% by weight of a styrene compound or a $C_1$–$C_8$-alkyl acrylate or methacrylate, or a mixture thereof, and
    $a_S/2$) from 0 to 50% by weight of one or more other monomers,
B) from 1 to 50% by weight of a thermoplastic polymer and
C) from 1 to 70% by weight of an elastomeric block copolymer prepared by anionic polymerization of the monomers with addition of a potassium compound soluble in non-polar solvents (Step 1) followed by hydrogenation of all or virtually all the olefinic double bonds of the polymer obtained in Step 1, as described in greater detail herein.

16 Claims, No Drawings

THERMOPLASTIC MOULDING COMPOUNDS

The present invention relates to thermoplastic molding compositions comprising
A) from 30 to 98% by weight of a graft copolymer comprising
  $a_K$) from 30 to 90% by weight of an elastomeric graft core, obtained by copolymerization of
    $a_K/1$) from 80 to 99.99% by weight of one or more $C_1$–$C_{10}$-alkyl acrylates,
    $a_K/2$) from 0.01 to 20% by weight of a monomer with crosslinking effect, and
    $a_K/3$) from 0 to 40% by weight of one or more other monomers,
  $a_S$) from 10 to 70% by weight of a graft shell comprising
    $a_S/1$) from 50 to 100% by weight of a styrene compound of the formula

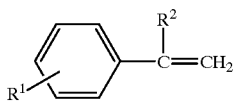

where $R^1$ and $R^2$ are hydrogen or $C_1$–$C_8$-alkyl, or a $C_1$–$C_8$-alkyl acrylate or methacrylate, or a mixture of the styrene compound and the $C_1$–$C_8$-alkyl acrylate or methacrylate, and
    $a_S/2$) from 0 to 50% by weight of one or more other monomers,
B) from 1 to 50% by weight of a thermoplastic polymer comprising
  $b_1$) from 50 to 100% by weight of styrene or α-methylstyrene or mixtures of these
  $b_2$) from 0 to 50% by weight of acrylonitrile, and
  $b_3$) from 0 to 50% by weight of one or more other monomers, and
C) from 1 to 70% by weight of an elastomeric block copolymer prepared by
  anionic polymerization of the monomers with addition of a potassium compound soluble in non-polar solvents (Step 1)
  followed by hydrogenation of all or virtually all the olefinic double bonds of the polymer obtained in Step 1) (Step 2),
  which essentially consists of
  at least one block A, which forms a hard phase and contains, in its polymer chain, units of a vinylaromatic monomer,
  or a block B, which forms a first elastomeric (soft) phase and contains diene monomers,
  or block A and block B,
  and at least one elastomeric block B/A, which forms a (if appropriate second or further) soft phase, and contains, randomly in its polymer chain, units of both a vinylaromatic monomer and a diene,
  where the glass transition temperature $T_g$ of the block A is above 25° C. and that of the block B/A, before hydrogenation, is below 25° C. and the phase-volume ratio of block A to block B/A is chosen so that the proportion of the hard phase in the entire block copolymer is from 1 to 40% by volume and the proportion by weight of the diene is less than 50% by weight.

The invention relates, furthermore, to molding compositions in which component C) is prepared in a specific manner, to molding compositions in which component(s) C) and/or B) have a specific formulation and/or chemical structure, to the use of these molding compositions for producing films and shaped articles, to films and shaped articles made from these molding compositions, and finally to the use of these films and shaped articles.

Plastic films have various areas of application. Certain films, in particular flexible films with a leather-like appearance, are extensively used in interior decoration, for example of automobiles, or as leather substitutes. They are mostly produced by calendering or extrusion.

The main constituent of these films is currently usually polyvinyl chloride (PVC), which contains plasticizer and frequently also contains other vinyl polymers. However, the films have only limited resistance to ageing, and furthermore the plasticizer which is used can exude out over the course of time.

EP-A 526 813 discloses thermoplastic molding compositions made from a highly crosslinked acrylate rubber with a graft shell of methyl methacrylate or styrene-acrylonitrile, a partially cross-linked acrylate rubber, an ethylene-vinyl acetate copolymer and, if desired, a further polymer based on styrene and/or acrylic compounds. Under the conditions of shaping, to give films for example, these materials tend to undergo undesirable degradation reactions.

DE-A 42 11 412 recommends as a material for films mixtures which are made from styrene-acrylonitrile polymers and thermoplastics and which have a graft shell of an elastomeric polymer. The preparation of graft copolymers of this type is, however, technically complicated, so that it is difficult to obtain consistent product quality.

In particular, films made from presently known molding compositions do not have fully satisfactory thermoforming properties; they also have a high Shore hardness, which does not always allow the desired soft, leather-like surface to be achieved.

It is an object of the present invention to provide thermoplastic molding compositions which are easy to prepare in consistent quality and which can be further processed into shaped articles, in particular into films, without loss of quality arising, for example, through degradation reactions. A further object is to provide, molding compositions from which it is possible to produce shaped articles, in particular films, which are distinguished by good thermoforming properties (high elongation at break and high tear resistance) and by low Shore hardness.

We have found that this object is achieved by means of the thermoplastic molding compositions defined at the outset.

Furthermore, molding compositions comprising specific embodiments of component C) have been found. In addition, the use of the polymer mixtures for producing films and shaped articles, and films and shaped articles made from these materials, have been found. Component A) is present in the novel compositions in an amount, based on the sum of components A), B) and C), of from 30 to 98, preferably from 40 to 90 and particularly preferably from 50 to 82% by weight. This component is a particulate graft copolymer built up from an elastomeric graft core $a_K$) ("soft component") and a shell $a_S$) ("hard component") grafted thereto.

The graft core $a_K$) is present in a proportion of from 30 to 90, preferably from 40 to 80 and in particular from 50 to 75% by weight, based on component A).

The graft core $a_K$) is obtained by polymerization of a monomer mixture of, based on $a_K$),
$a_K/1$) from 80 to 99.99, preferably from 85 to 99.5 and particularly preferably from 90 to 99% by weight of one or more $C_1$–$C_{10}$-alkyl acrylates, $a_K/2$) from 0.01 to 20, preferably 0.5 to 10 and particularly preferably from 1 to 5% by weight of a monomer with crosslinking effect, and $a_K/3$) from 0 to 20, preferably from 0 to 5% by weight of one or more other monomers.

Useful alkyl acrylates $a_K/1$) are especially those derived from ethanol, 2-ethylhexanol or in particular from n-butanol. One single alkyl acrylate or a mixture of a number of alkyl acrylates with different alkyl radicals may be used.

Monomers with crosslinking effect $a_K/2$) are bi- or polyfunctional comonomers, for example butadiene, isoprene, divinyl esters of dicarboxylic acids, such as succinic acid and adipic acid, diallyl and divinyl ethers of dihydric alcohols, such as ethylene glycol and butane-1,4-diol, diesters of acrylic acid and methacrylic acid with the above-mentioned dihydric alcohols, 1,4-divinylbenzene and triallyl cyanurate. Particular preference is given to the tricyclodecenyl acrylate of the formula below

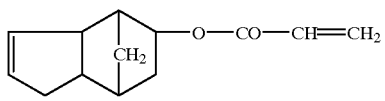

which is known as dihydrodicyclopentadienyl acrylate, and to allyl acrylates and allyl methacrylates.

Component $a_K$) in the molding compositions can also contain other monomers $a_K/3$) which vary the mechanical and thermal properties of the core within a particular range, with reduction in the amounts of the monomers $a_K/1$) and $a_K/2$). The following may be mentioned as examples of such monoethylenically unsaturated comonomers $a_K/3$): vinylaromatic monomers, such as styrene and styrene derivatives of the formula I

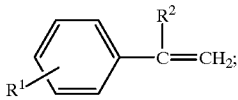

(I)

where $R^1$ and $R^2$ are hydrogen or $C_1$–$C_8$-alkyl;
methacrylonitrile, acrylonitrile;
acrylic acid, methacrylic acid, dicarboxylic acids, such as maleic acid and fumaric acid, and their anhydrides, such as maleic anhydride;
nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide;
$C_1$–$C_4$-alkyl methacrylates, such as methyl methacrylate, ethyl methacrylate, n-propyl methacrylate, isopropyl methacrylate, n-butyl methacrylate, isobutyl methacrylate, sec-butyl methacrylate, tert-butyl methacrylate and hydroxyethyl acrylate;
aromatic and araliphatic esters of acrylic acid and of methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;
unsaturated ethers, such as vinyl methyl ether
and mixtures of these monomers.

The graft shell $a_S$) is obtained by polymerization of a monomer mixture comprising, based on $a_S$), $a_S/1$) from 50 to 100, preferably from 60 to 95 and particularly preferably from 65 to 85% by weight of a styrene compound of the formula I

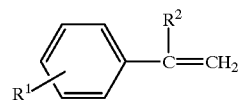

(I)

where $R^1$ and $R^2$ are hydrogen or $C_1$–$C_8$-alkyl
or a $C_1$–$C_8$-alkyl acrylate or methacrylate
or a mixture of the styrene compound and the $C_1$–$C_8$-alkyl acrylate or methacrylate, and $a_S/2$) from 0 to 50, preferably from 15 to 35% by weight of one or more other monomers.

The styrene compound of the formula (I) (component $a_S/1$)) is preferably styrene, α-methylstyrene or ring-$C_1$–$C_8$-alkylated styrenes, such as p-methylstyrene or tert-butylstyrene. Styrene is particularly preferred.

The styrene compounds can be replaced by or mixed with $C_1$–$C_8$-alkyl acrylates and/or methacrylates, in particular those derived from methanol, ethanol, n-propanol, isopropanol, sec-butanol, tert-butanol, isobutanol, pentanol, hexanol, heptanol, octanol and 2-ethylhexanol, and especially from n-butanol. Methyl methacrylate is particularly preferred.

The shell $a_S$) can also comprise other comonomers $a_S/2$), with reduction in the amounts of the monomers $a_S/1$). For component $a_S/2$), the same recommendations apply as for component $a_K/3$).

In addition, other monomers which may be mentioned for $a_S/2$) are: maleimide, N-methyl-, N-phenyl- and N-cyclohexylmaleimide, and monomers which are modified with acid or basic functional groups, e.g. the acids mentioned for $a_K/3$) and their anhydrides and the nitrogen-functional monomers mentioned for $a_K/3$). For component $a_S/2$), among the monomers mentioned preference is given to acrylonitrile, methacrylonitrile and maleimide, and particular preference is given to acrylonitrile.

The graft shell $a_S$) is preferably built up from styrene or methyl methacrylate, or from a mixture of from 40 to 90% by weight of methyl methacrylate and acrylonitrile as the remainder, or from a mixture of from 65 to 85% by weight of styrene and acrylonitrile as the remainder.

The graft copolymers A) are obtainable in a manner known per se, preferably by emulsion polymerization at from 30 to 80° C. Suitable emulsifiers here are, for example, alkali metal alkyl- or alkyl- arylsulfonates, alkylsulfates, fatty alcohol sulfonates, salts of higher carboxylic acids with from 10 to 30 carbon atoms, sulfosuccinates, ether sulfonates or resin soaps. Preference is given to alkali metal alkylsulfonates or carboxylic acids with from 10 to 18 carbon atoms.

In preparing the dispersion, it is preferable to use an amount of water which gives the finished dispersion a solids content of from 20 to 50% by weight.

Preferred polymerization initiators are free-radical generators, for example peroxides, such as preferably peroxosulfates, and azo compounds, such as azobisisobutyronitrile. However, redox systems, in particular based on hydroperoxides, such as cumene hydroperoxide, can also be used. In conjunction with these, molecular weight regulators, such as ethylhexyl thioglycolate, n- and tert-dodecyl mercaptan, terpinols and dimeric α-methylstyrene, may be used.

In order to maintain a constant pH, preferably from 6 to 9, buffers, such as $Na_2HPO_4/NaH_2PO_4$ or sodium bicarbonate, may be added.

The emulsifiers, initiators, regulators and buffers are employed in conventional amounts, so that more detailed instructions are not necessary.

The graft core can particularly preferably also be prepared by polymerization of the monomers $a_K$) in the presence of a fine-particle rubber latex (the "seed-latex" polymerization method).

In principle, it is also possible to prepare the graft base by a process other than emulsion polymerization, e.g. by bulk or solution polymerization, and then to emulsify the polymer obtained. Microsuspension polymerization is also suitable, oil-soluble initiators, such as lauryl peroxide and tert-butyl perpivalate being preferable. The methods for this are known.

The graft shell $a_S$ can have been built up in one step, with components $a_S/1$) and $a_S/2$) generally being added simultaneously or progressively. It may also be built up in a number of steps, with, for example, component $a_S/1$) being polymerized first, followed by component $a_S/2$) or a mixture of $a_S/1$) and $a_S/2$). The $a_S/1$):$a_S/2$) mixing ratio can be constant or can vary continuously or step-wise over the course of the addition.

Furthermore, it is known to the person skilled in the art that the graft monomers $a_S/1$) and $a_S/2$) may be added all at once (batchwise), or as a progressive feed at constant or variable rate. Combinations of these methods of addition are frequently encountered.

The reaction conditions are preferably balanced with respect to one another in a manner known per se so that the polymer particles have a substantially uniform diameter $d_{50}$ in the range from 60 to 1500, in particular from 150 to 1000 nm.

In place of a single graft copolymer A), it is also possible to use various such polymers for producing the novel thermoplastic compositions, in particular those having significantly differing particle size. Mixtures of this type with a bimodal size distribution have technical advantages during further processing. Useful particle diameters are in the range from 60 to 200 nm on the one hand and from 300 to 1000 nm on the other hand.

Also useful are graft copolymers with a number of "soft" and "hard" shells, e.g. of $a_K$)-$a_S$)-$a_K$)-$a_S$) or $a_S$)-$a_K$)-$a_S$) construction, especially in cases where the particle size is relatively large.

Any non-grafted polymers formed from the monomers as) during the grafting process, generally less than 10% by weight of $a_S$), are counted as part of the mass of component A).

The novel molding composition comprises component B) in a proportion of from 1 to 50, preferably from 5 to 40 and particularly preferably from 10 to 30% by weight, based on the sum of components A), B) and C). Component B) is a thermoplastic polymer comprising $b_1$) from 50 to 100, preferably from 55 to 95 and particularly preferably from 60 to 85% by weight of styrene or α-methylstyrene or mixtures of these, $b_2$) from 0 to 50, preferably from 5 to 45 and particularly preferably from 15 to 40% by weight of acrylonitrile, and $b_3$) from 0 to 50, preferably from 0 to 40% by weight of one or more other monomers, each based on component B). Useful monomers $b_3$) are those mentioned for component $a_K/3$) and $a_S/2$).

Preferred monomers $b_3$) are alkyl and aryl methacrylates and methacrylamides. Preferred monomers $b_3$) which may be mentioned are: methyl methacrylate, maleic anhydride, maleimide, and lesser amounts of glycidyl methacrylate, acrylic acid, methacrylic acid and dimethylaminoethyl acrylate.

Component B) preferably comprises, for example, a copolymer of from 60 to 95% by weight of styrene and from 5 to 40% by weight of acrylonitrile. A copolymer of from 60 to 85% by weight of styrene and from 15 to 40% by weight of acrylonitrile is particularly preferred.

The polymers B), also generally termed SAN polymers because of their main components styrene and acrylonitrile, are known and in some cases commercially available. They generally have a viscosity number VN (measured according to DIN 53 726 at 25° C., 0.5% by weight in dimethylformamide) of from 40 to 160 ml/g, corresponding to a mean molar mass (weight-average) of approximately from 40,000 to 2 million. They are obtained in a conventional manner by bulk, solution, suspension, precipitation or emulsion polymerization. Details of these processes are described, for example, in Kunststoffhandbuch, Ed. R. Vieweg and G. Daumiller, Vol. V "Polystyrene", Carl-Hanser-Verlag Munich 1969, p. 118ff.

The polymer B) can also be a mixture of different copolymers of styrene and/or a-methylstyrene and acrylonitrile, varying, for example, in their content of acrylonitrile or in their mean molar mass.

The molding compositions contain a proportion of component C), based on the sum of components A), B) and C), of from 1 to 70, preferably from 5 to 50 and particularly preferably from 8 to 40% by weight. Component C) is an elastomeric block copolymer prepared by anionic polymerization of the monomers with addition of a potassium compound soluble in non-polar solvents (Step 1)

followed by hydrogenation of all or virtually all the olefinic double bonds of the polymer obtained in Step 1) (Step 2), which essentially consists of at least one block A, which forms a "hard" phase and contains, in its polymer chain, units of a vinylaromatic monomer, or a block B, which forms a (first) elastomeric (soft) phase and contains, in its polymer chain, diene monomers, or block A and block B, and at least one block B/A, which forms a "soft phase" and contains, randomly in its polymer chain, units of a vinylaromatic monomer and of a diene, where the glass transition temperature $T_g$ of the block A is above 25° C. and that of the block B/A, before hydrogenation, is below 25° C. and the phase-volume ratio of block A to block B/A is chosen so that the proportion of the hard phase in the entire block copolymer is from 1 to 40% by volume and the proportion by weight of the diene is less than 50% by weight.

Details on the construction and preparation of component C) can be found below and also in DE-A-44 20 952, which is expressly incorporated herein by way of reference.

The soft phase (block B/A) is obtained by random copolymerization of vinylaromatic monomers and dienes.

A hydrogenated block copolymer C) may be, for example, one of the formulae 1–11:

$$(A-B/A)_n; \quad (1)$$

$$(A-B/A)_n-A, \text{ preferably } A-B/A-A; \quad (2)$$

$$B/A-(A-B/A)_n; \quad (3)$$

$$X-[(A-B/A)_n]_{m+1}; \quad (4)$$

$$X-[(B/A-A)_n]_{m+1}, \text{ preferably } X-[-B/A-A]_2; \quad (5)$$

$$X-[(A-B/A)_n-A]_{m+1}; \quad (6)$$

$$X-[(B/A-A)_n-B/A]_{m+1}; \quad (7)$$

$$Y\text{-}[(A\text{-}B/A)_n]_{m+1}; \tag{8}$$

$$Y\text{-}[(B/A\text{-}A)_n]_{m+1}; \text{ preferably } Y\text{-}[\text{-}B/A\text{-}A]_2; \tag{9}$$

$$Y\text{-}[(A\text{-}B/A)_n\text{-}A]_{m+1}; \tag{10}$$

$$Y\text{-}[(B/A\text{-}A)_n\text{-}B/A]_{m+1}; \tag{11}$$

where A is the vinylaromatic block and B/A is the soft phase, i.e. the block built up randomly from diene and vinylaromatic units, X is the radical of an n-functional initiator, Y is the radical of an m-functional coupling agent and m and n are integers from 1 to 10, and where the diene units have been converted into ethene-butene units by hydrogenation.

Preference is given to a block copolymer whose soft phase B/A is divided into blocks $$(B/A)_1\text{-}(B/A)_2; \tag{12}$$

$$(B/A)_1\text{-}(B/A)_2\text{-}(B/A)_1; \tag{13}$$

$$(B/A)_1\text{-}(B/A)_2\text{-}(B/A)_3; \tag{14}$$

where the vinylaromatic/diene ratio in the individual blocks B/A may be different or may vary continuously (in particular may increase) within a single block within the limts (B/A)$_1 \rightarrow$(B/A)$_3$, where the glass transition temperature $T_g$ of each sub-block before hydrogenation is below 25° C. Version (14) is particularly preferred.

A particularly preferred hydrogenated block copolymer C) has the formula $$(A\text{-}B/A)_1\text{-}A. \tag{2}$$

Very particular preference is given to hydrogenated block copolymers C) of the formula $$A\text{-}B/A\text{-}A. \tag{19}$$

Preference is also given to a block copolymer having a number of blocks B/A and/or A of different molar mass in each molecule.

Likewise, a block B polymerized from diene monomers can replace a block A built up exclusively from vinylaromatic units, since the overall point is simply that an elastomeric block copolymer is formed. Such copolymers can, for example, have the structure (15)–(18)

$$B\text{-}(B/A) \tag{15}$$

$$(B/A)\text{-}B\text{-}(B/A) \tag{16}$$

$$(B/A)_1\text{-}B\text{-}(B/A)_2 \tag{17}$$

$$B\text{-}(B/A)_1\text{-}(B/A)_2. \tag{18}$$

Preferred vinylaromatic compounds for the purposes of the invention are styrene, α-methylstyrene and vinyltoluene and mixtures of these. Preferred dienes are butadiene and isoprene, piperylene, 1-phenylbutadiene and mixtures of these.

A particularly preferred monomer combination is butadiene and styrene. All of the weight and volume information given below refers to this combination.

The B/A block is built up from approximately 75–30% by weight of styrene and 25–70% by weight of butadiene. Particular preference is given to a soft block comprising from 35 to 70% of butadiene and from 65 to 30% of styrene.

In the case of the monomer combination styrene-butadiene, the proportion by weight of the diene in the entire block copolymer is from 15 to 50% by weight, and that of the vinylaromatic component is correspondingly from 85 to 50% by weight. Particular preference is given to butadiene-styrene block copolymers having a monomer composition of from 25 to 50% by weight of diene and from 75 to 50% by weight of vinylaromatic compound.

More detailed information about the preparation of component C) is given below:

In a first step, the block copolymers are prepared by anionic polymerization in a non-polar solvent with addition of a potassium compound which is soluble in nonpolar solvents. Preferred solvents for the polymerization are aliphatic hydrocarbons, such as in particular cyclohexane or methylcyclohexane. Other suitable solvents are cyclopentane, decalin, methylcyclopentane and benzene.

The anionic polymerization is initiated by organometallic compounds, in particular organolithium compounds, such as methyllithium, ethyllithium, propyllithium, n-butyllithium, sec-butyllithium or tert-butyllithium. The organometallic compound is added as solution in a chemically inert hydrocarbon, generally in an amount of from 0.002 to 5 mol %, based on the monomers.

The potassium compounds which are used in the anionic polymerization in addition to the organometallic compound, preferably organolithium compound, for example tert-butyllithium, are generally potassium salts of organic molecules. Particularly suitable are potassium alkoxides, and particularly preferred amongst these are alkoxides of tertiary alcohols having at least 7 carbon atoms.

Very particular preference is given to the potassium salts of 3-ethyl-3-pentanol and 2,3-dimethyl-3-pentanol and especially of 3,7-dimethyl-3-octanol (tetrahydrolinalool).

Other salts which are inert to metal alkyls, for example dialkyl-potassium amides, alkylated diarylpotassium amides, potassium alkylthiolates and potassium alkylarylthiolates, are also suitable potassium compounds.

Suitable non-polar solvents for the potassium compound are, for example, cyclopentane, methylcyclopentane, cyclohexane, methyl-cyclohexane, decalin or benzene.

Cyclohexane, cyclopentane and methylcyclohexane are preferred.

The preparation of the potassium alkoxides is generally carried out by stirring the corresponding alcohol with an excess of potassium-sodium alloy in an inert solvent such as cyclohexane, for about 24 hours at room temperature or for a few hours with heating under reflux.

Alternatively, the alcohol can be mixed with a small excess of potassium methoxide, potassium ethoxide or potassium tert-butoxide in the presence of a high-boiling inert solvent, such as decalin or ethylbenzene; the lower-boiling alcohol, in this case methanol, ethanol or tert-butanol, is distilled off, the residue is diluted with cyclohexane and filtered to remove excess of poorly-soluble alkoxide.

Random distribution of the vinylaromatic and diene units in the copolymer can also be achieved, using a method which is not within the invention, by addition of a polar co-solvent, in particular an ether, such as tetrahydrofuran (THF), but the ratio of 1,2- to 1,4-linkages of the diene is significantly increased by the addition of polar co-solvents. This changes the property spectrum of shaped articles containing component C), an effect which can be disadvantageous in certain of their applications.

In contrast, addition of a potassium compound in place of the polar co-solvent alters this ratio very little or not at all, with positive effect on certain mechanical properties of shaped articles containing component C) of the invention.

The proportion of 1,2-linkages of the diene in component C), based on the total of 1,2- and 1,4-linkages, is generally increased by less than 2% and is usually from 8 to 15%, and preferably, at an Li/K-ratio of greater than 25 to 1, from 9 to 11%, based on the abovementioned total.

In order to obtain a strictly random distribution of the monomer units, an alkyllithium compound as described above must generally be used in conjunction with the potassium compound.

For this strictly random case for butyllithium-initiated polymerization in cyclohexane, the molar ratio of lithium to potassium is from 10:1 to 40:1. If a progression in the composition is desired along the random block in favor of styrene and away from butadiene, Li/K-ratios of greater than 40:1 should be selected; for a progression away from styrene in favor of butadiene, ratios of less than 10:1 should be selected.

The point in time at which the sodium salt is added to the reaction mixture can vary, but the following procedure is preferred: at least some of the polymerization solvent and at least some of the monomer for the first block are charged to the reaction vessel. It is not advisable to add the potassium compound at this time, since traces of protic impurities would hydrolyze it at least partially to KOH and alcohol, so that the potassium ions would be irreversibly deactivated for the polymerization.

The alkyllithium compound is therefore preferably admixed first, and the potassium compound subsequently.

It is advisable to add the potassium compound just before the polymerization of the random block.

The polymerization can be carried out at from 0 to 130° C., preferably at from 30 to 100° C.

According to the invention, the volume proportion in component C) of the soft phase constructed from diene and vinylaromatic sequences is from 60 to 99, preferably from 70 to 90 and particularly preferably from 80 to 90% by volume. The blocks A, which are made from the vinylaromatic monomers, form the hard phase, whose volume proportion is correspondingly from 1 to 40, preferably from 10 to 30 and particularly preferably from 10 to 20% by volume.

It should be pointed out that, because of rounding errors, there is no precise agreement between the abovementioned quantity ratios of vinylaromatic compound and diene, the threshold values of the phase volumes stated above and the composition implied by the glass transition temperature ranges according to the invention. Where this is the case, it would be coincidental.

The volume proportion of the two phases can be measured by phase-contrast electron microscopy or solid-state NMR spectroscopy. The proportion of the vinylaromatic blocks can be determined, after osmium degradation of the polydiene fraction, by precipitation and weighing. If polymerization is always allowed to proceed to completion, the future phase ratio of any polymer can be calculated from the amounts of monomers employed.

The quotient of the volume proportion in percent of the soft phase formed from the B/A blocks and the proportion of diene units in the soft phase is between 25 and 70% by weight for the combination styrene-butadiene.

The soft phases (blocks B and B/A) of components C) usually have a glass transition temperature of from −50 to +25° C., preferably from −50 to +5° C. The glass transition temperature of the hard phase (block A) is preferably above +50° C.

The molar mass of block A is, for example, from 1000 to 200,000, preferably from 3000 to 80,000 [g/mol]. Blocks A may have different molar masses within a single molecule.

The molar mass of block B/A is usually from 2000 to 250,000, preferably from 5000 to 150,000 [g/mol]. Like block A, block B/A can also have different molar masses within a single molecule.

The coupling center X or Y is formed by reaction of the living anionic chain ends with an at least bifunctional coupling agent. Examples of such compounds are found in U.S. Pat. Nos. 3,985,830, 3,280,084, 3,637,554 and 4,091,053. Preference is given to the use of, for example, epoxidized glycerides, such as epoxidized linseed oil or soya oil; divinylbenzene is also suitable. Dichlorodialkylsilanes, dialdehydes, such as terephthaldehyde, and esters, such as ethyl formate, acetate or benzoate, are suitable specifically for dimerization.

The random block B/A may itself be subdivided into blocks B1/A1-B2/A2-B3/A3- . . . . The random block preferably comprises from 2 to 15 random sub-blocks, particularly preferably from 3 to sub-blocks.

The polymerization is carried out in a number of steps and, in the case of monofunctional initiation, is begun, for example, by preparing the hard block A. Part of the monomers is precharged in the reactor and the polymerization is started by addition of the initiator. In order to achieve a defined chain construction, it is advisable although not essential to carry the process to a high degree of conversion (greater than 99%) before the second monomer is added.

The manner of the second monomer addition depends on the selected block construction. In the case of monofunctional initiation, the vinylaromatic compound is, for example, first precharged or directly metered in. A solution of the potassium compound in a non-polar solvent, such as cyclohexane, is generally then added. The random construction and the composition of the block B/A depend on the quantity ratio of diene to vinylaromatic compound, the concentration and chemical structure of the potassium compound and the temperature.

According to the invention, the diene is present in a proportion by weight of from 25% to 70% based on the total weight including the vinylaromatic compound. Block A can then be grafted on by adding the vinylaromatic compound. Alternatively, required polymer blocks can also be bonded with one another through the coupling reaction. In the case of bifunctional initiation, the block B/A is constructed first, followed by the block A.

The reaction is terminated in a manner known per se by addition of a polar compound, such as water or an alcohol, for example ethanol or isopropanol.

The hydrogenation of the olefinic double bonds still present in the polymer and deriving from the diene is carried out in a second step after the block copolymer is prepared in the first step by the anionic polymerization already described.

The hydrogenation is carried out in a manner known per se, preferably in homogeneous phase, using hydrogen and a soluble, selective hydrogenation catalyst, such as a mixture of nickel(II) acetylacetonate and triisobutylaluminum, in an inert solvent, such as hexane. The hydrogenation is preferably carried out at from 20 to 200° C., particularly preferably at from 100 to 170° C., and a hydrogen pressure in the range from 6 to 30 bar, preferably from 10 to 20 bar absolute pressure is advisable.

It is not necessary to hydrogenate all the non-aromatic double bonds; a degree of hydrogenation of at least 80%, preferably at least 95%, is sufficient.

The hydrogenation may be described by way of example using the following embodiment:

The hydrogenation catalyst is usually prepared separately in solution form as follows: a 20% strength hexane solution of triisobutylaluminum is added at room temperature to a 1% strength solution of nickel acetylacetonate in toluene, the weight ratio of nickel acetylacetonate to triisobutylaluminum being in the range of about 1:4. After the weakly exothermic reaction has finished, the fresh catalyst solution is added to the polymer solution and the reactor is charged with hydrogen. 1.5 g of nickel acetylacetonate per kg of polymer are generally sufficient; under especially inert conditions, however, 0.15 g is usually sufficient. The rate of hydrogenation depends on the hydrogen pressure and the reaction temperature as well as on the catalyst concentration. The preferred extent of hydrogenation of at least 95% is usually achieved in as little as from 30 to 120 minutes at from 180 to 200° C. with a partial hydrogen pressure of 15 bar.

Hydrogenation temperatures above 170° C. can, however, cause an undesired partial hydrogenation of the phenyl groups, and for this reason it is particularly preferable not to hydrogenate at above 170° C.

At about 120° C., the hydrogenation generally takes from 8 to 16 h.

Good intermixing of the hydrogen gas is advantageous for optimum space-time yield. An effective stirrer which gives thorough vertical mixing is preferably used. Gas dispersion stirrers are particularly suitable.

After hydrogenation, the colloidally distributed nickel, which colors the polymer solution black, can be oxidized, for example with a hydrogen peroxide/acetic acid mixture, with removal of the color.

The hydrogenation may of course also be carried out using other homogeneous and heterogeneous hydrogenation catalysts, in which connection hydrogenation on solid bed catalysts may particularly be mentioned. This embodiment of the hydrogenation avoids contamination of the polymer C) by catalyst residues, which makes the molding compositions particularly resistant to weathering. Component C) prepared in this way is, furthermore, completely colorless; this may, depending on their application, be advantageous in the films produced from the molding compositions.

The work-up to give the desired hydrogenated polymer C) with molecular weight (weight-average) preferably set at from 50,000 to 300,000, particularly from 70,000 to 180,000, is carried out in the usual manner. The solvent is generally removed first, and then the polymer is extruded and granulated.

The hydrogenated soft phase (block B/A) then consists essentially of an ethene-butene-styrene copolymer, where the ethene/butene ratio depends on the ratio of 1,4- to 1,2-linkages. Polymers with a small butene/ethene ratio, as formed using potassium salts, have a crystalline fraction due to the polyethylene sequences. They are more rigid than polymers of the same block construction prepared with addition of a polar cosolvent, such as THF, and having therefore a high butene/ethene ratio.

In addition to components A), B) and C), the thermoplastic molding compositions can also contain additives, such as lubricants and release agents, pigments, dyes, flame retardants, antioxidants, light stabilizers, fillers and reinforcing agents in fiber or powder form and antistats, in the amounts usual for these agents. Particularly when films are to be produced from the novel molding compositions, plasticizer is added, for example copolymers of from 30 to 70% by weight of ethylene oxide and from 70 to 30% by weight of 1,2-propylene oxide which have a mean molecular weight of from 2000 to 8000, in amounts of from 0.5 to 10% by weight, based on the total of components A), B) and C).

The preparation of the novel molding compositions can be carried out by mixing processes known per se, for example by melting in an extruder, Banbury mixer, compounder, roll mill or calender, but the components can also be mixed "cold" without melting, in which case the mixture comprising powder or granules is not melted and homogenized until it is further processed.

Shaped articles of all types, in particular films, can be produced from the molding compositions. The films can be produced by extrusion, roll-milling, calendering and other processes known to the person skilled in the art. By these means, the novel molding compositions are shaped, by heating and/or friction, either by themselves or with addition of plasticizing or other additives, to give a film capable of further processing. The conversion of films of this type into finished products is carried out, for example, by thermoforming.

The films have various applications, in particular in the automotive sector in the design of car interiors, in decorative applications, as leather substitutes in the production of suitcases and bags, and in the furniture sector as covering material for lamination of furniture surfaces.

The novel thermoplastic molding compositions contain no halogen. They are exceptionally free of constituents which can escape by evaporation or exudation, and during further processing they show virtually no undesirable degradative changes, such as, for example, discoloration. Furthermore, they have good mechanical properties. In particular, the films produced from the novel molding compositions have good thermoforming properties (high values for elongation at break and tear resistance) and a pleasant "soft touch" feel.

EXAMPLES

The following components were prepared and/or used (percentages are by weight)

Component A):

Particulate graft copolymer comprising crosslinked poly-n-butyl acrylate (core) and styrene-acrylonitrile copolymer (shell)

A mixture of 98 g of n-butyl acrylate and 2 g of dihydrodicyclopentadienyl acrylate and, separately, a solution of 1 g of sodium $C_{12}$–$C_{18}$-paraffinsulfonate in 50 g of water were added to a mixture of 3 g of a polybutyl acrylate seed latex, 100 g of water and 0.2 g of potassium persulfate, over 4 hours at 60° C., after which the polymerization was continued for a further 3 hours. The latex obtained had a mean particle diameter $d_{50}$ of 430 nm with a narrow particle size distribution (Q=0.1).

150 g of this latex were mixed with 60 g of water, 0.03 g of potassium persulfate and 0.05 g of lauroyl peroxide, after which, over a period of 3 hours at 65° C., 20 g of styrene and then, over a period of a further 4 hours, a mixture of 15 g of styrene and 5 g of acrylonitrile were grafted onto the latex particles. The polymer was then precipitated using a calcium chloride solution at 95° C., separated, washed with water and dried in a stream of warm air. The degree of grafting of the polymer was 35% and the particles had a mean diameter $d_{50}$ of 510 nm.

The graft copolymer had the following composition (rounded values):

60% by weight of a graft core of polybutyl acrylate, crosslinked,

20% by weight of an inner graft of styrene polymer and

20% by weight of an outer graft of styrene-acrylonitrile copolymer with weight ratio S/AN 3:1.

The seed polymer used at the start was prepared by the process of EP-B 6503 (column 12, line 55, to column 13, line 22) by polymerization of n-butyl acrylate and tricyclodecenyl acrylate in aqueous emulsion, and had a solids content of 40%.

The mean particle size mentioned in the description of component A) is the weight average of the particle sizes.

The mean diameter corresponds to the $d_{50}$ value, according to which 50% by weight of all particles have a smaller, and 50% by weight a larger, diameter than the diameter corresponding to the $d_{50}$ value. In order to characterize the width of the particle size distribution, the $d_{10}$ and the $d_{90}$ values are often stated in addition to the $d_{50}$ value. 10% by weight of all particles are smaller, and 90% by weight are larger, than the $d_{10}$ diameter. Analogously, 90% by weight of all particles have a smaller, and 10% by weight a larger, diameter than the diameter corresponding to the $d_{90}$ value. The quotient $Q=(d_{90}-d_{10})/d_{50}$ is a measure of the width of the particle size distribution. The smaller is Q, the narrower is the distribution.

Component B):
Copolymer of styrene and acrylonitrile

A copolymer of 65% by weight of styrene and 35% by weight of acrylonitrile was prepared by the continuous solution polymerization process as described in Kunststoff-Handbuch, ed. R. Vieweg and G. Danmiller, Vol. V "Polystyrene", Carl-Hanser-Verlag Munich 1969, pp. 122 to 124. The viscosity number VN (determined according to DIN 53 726 at 25° C., 0.5% by weight in dimethylformamide) was 80 ml/g.

Component C) (according to the invention): elastomeric block copolymer

A heatable and coolable 50 l stainless steel autoclave with cross-paddle stirrer was prepared by flushing with nitrogen and scalding with a solution of sec-butyllithium and 1,1-diphenylethylene (molar ratio 1:1) in cyclohexane, followed by drying.

The autoclave was filled with 22.8 l of cyclohexane; 87.3 mmol of sec-butyllithium were then added, followed by the monomers necessary for the first step and finally a 10% strength by weight solution of 4.37 mmol of potassium tetrahydrolinaloolate in cyclohexane. The molar ratio Li:K was 20:1. Table 1 shows the individual steps of the polymerization.

In each step, the duration of the monomer feed was small in comparison with the duration of the polymerization. The stated starting and/or final temperatures were set by heating and/or cooling of the reactor jacket.

TABLE 1

| Step | 1 | 2 | 3 | 4 | 5 |
|---|---|---|---|---|---|
| Butadiene feed [g] | — | 1172 | 1172 | 1172 | — |
| Styrene feed [g] | 1048 | 1477 | 1477 | 1477 | 1048 |
| $T_{start}$ [° C.] | 40 | 52 | 55 | 54 | 70 |
| $T_{end}$ [° C.] | 70 | 75 | 76 | 75 | 72 |
| Duration of polymerization [min] | 30 | 13 | 13 | 17 | 40 |

At the end of the reaction (consumption of the monomers) the polymerization was terminated by titration with ethanol until the mixture was colorless, and the mixture was then acidified with a 1.5-fold excess of formic acid. 34 g of 2-(1,1-dimethylethyl)-6-[[3-(1,1-dimethylethyl)-2-hydroxy-5-methylphenyl]methyl]-4-methylphenyl acrylate (Irganox 3052, Ciba-Geigy) and 82 g of tris(nonylphenyl) phosphite were then added.

The proportion of 1,2-linkages of the diene, determined by FTIR spectroscopy, was 10.4%, based on the total of 1,2- and 1,4-linkages.

The hydrogenation catalyst was prepared by adding 50 ml of a 20% strength by weight solution of triisobutylaluminum in hexane to 250 ml of a 1.136% strength by weight solution of nickel acetylacetonate in toluene at room temperature (mass ratio nickel acetylacetonate:triisobutylaluminum about 1:4). When the weakly exothermic reaction was complete, the fresh catalyst solution was added to 13.3 kg of a 15% strength by weight solution of the resultant polymer, and the mixture was exposed for 16 hours at 120° C. to a hydrogen pressure of 15 bar. The degree of hydrogenation was determined by Wijs titration of a hydrogenated sample in comparison with an unhydrogenated sample and was 98%.

After the hydrogenation, a mixture of 12 ml of hydrogen peroxide, 2.5 ml of formic acid and 50 ml of water was added to the black solution at 70° C., whereupon the reactor contents immediately became colorless.

The work-up of the reaction mixture to give the hydrogenated polymer was carried out as usual; it was expedient to remove the solvent in a vented extruder at 200° C. The product obtained was in granule form.

The polymer C) obtained had an

A–B/A–A structure in which the soft phase B/A is subdivided into 3 blocks as in $(B/A)_1-(B/A)_2-(B/A)_3$.

The terms A and B/A are taken to mean the polymer blocks already defined. Block A is a homopolystyrene block, block B/A is a block comprising randomly polymerized styrene and hydrogenated butadiene units. The proportion of butylene units in the soft phase B/A was 44% by weight, and the proportion of styrene units was 56% by weight.

The styrene proportion in the entire polymer C) was about 65% by weight.

The proportion of the two hard phases A in the polymer C) was in each case about 10.4% by weight, and the proportion of the soft phase B/A was correspondingly about 79.2% by weight.

The mean molar masses in g/mol of the polymers C) which were obtained were as follows: number-average $\overline{M}_n=131,000$, viscosity-average (peak maximum) $\overline{M}_p=150,000$, weight-average $\overline{M}_w=166,000$ (all molar masses were determined by gel permeation chromatography calibrated against polystyrene).

The glass transition temperatures $T_g$ were, before hydrogenation, from −45 to 0° C. for the soft phases (blocks B/A) and from 50 to 90° C. for the hard phases (blocks A), and after hydrogenation from −17 to +7° C. for the soft phases, and unchanged values for the hard phases.

For determination of the mechanical properties of component C), sheets of thickness 2 cm were pressed from the granules (3 min at 200° C.) out of which standard test specimens were stamped.

Table 2 shows the tests and results

TABLE 2

| | | Component C) | |
|---|---|---|---|
| Test | DIN Norm | before hydrogenation | after hydrogenation |
| Yield stress [N/mm$^2$] | 43504 | 1.5 | 5.0 |
| Breaking stress [N/mm$^2$] | 43504 | 21.4 | 31.0 |

TABLE 2-continued

| | | Component C) | |
|---|---|---|---|
| Test | DIN Norm | before hydrogenation | after hydrogenation |
| Elongation at break [%] | 43504 | 801 | 352 |
| Stress at 200%/400%/600% elongation [N/mm²] | 43504 | 2.9/6.4/11.4 | 17.5/—/— |

This shows that the strength increases after hydrogenation, as can be seen from the higher values for yield stress and breaking stress.

Component C*) (for comparison): hydrogenated styrene-butadiene copolymer

A solution of 520 g of styrene, 480 g of butadiene and 20 ml of tetrahydrofuran in 4 l of cyclohexane at 0° C. was first mixed slowly with sec-butyllithium in order to deactivate protic impurities. After the start of polymerization, recognizable from a temperature rise of 0.2° C., 0.8 g of sec-butyllithium was immediately added. The heat of polymerization was extracted by evaporative cooling, the rate of cooling being adjusted so that the temperature rose to 120° C. over 30 min. This temperature was maintained for a further 10 min, after which the polymerization was terminated by adding 1 g of ethanol.

For hydrogenation, a suspension of 1.5 g of nickel(II) acetylacetonate in 30 ml of toluene and 34 ml of a 20% strength by weight solution of triisobutylaluminum in hexane were added to the resultant polymer solution, and the mixture was then exposed to a hydrogen pressure of 15 bar for 60 min at from 80 to 110° C.

The work-up of the reaction mixture to give the hydrogenated polymer was carried out as usual; the solvent was expediently removed in a direct degassing apparatus.

The resultant polymer comprised a block which is butadiene-rich (styrene-poor) at its beginning and styrene-rich (butadiene-poor) at its end, i.e. there was a progression, and a homopolystyrene block attached to the styrene-rich end of the first block.

The styrene content of the resultant polymer, which is commercially obtainable as Glissoviscal® SG (BASF), was 52% by weight, based on the total weight of the polymer. The proportion in the polymer of homopolystyrene endblocks was 13% by weight. The mean molar mass, determined by gel permeation chromatography, of the product prepared in the described manner was 80,000.

Novel compositions and their properties

Mixtures were prepared from components A), B) and C) or C*) and were converted on a roll mill at 200° C. into films of 1 mm thickness.

The following properties of the films were determined:

Tensile strength: the tensile test was carried out according to DIN 53 504 on S 2 tensile specimens stamped out of the film.

Elongation at break: the elongation at the moment of application of breaking stress was measured in the tensile test according to DIN 53 504 and stated as % of the original dimension of the S 2 tensile specimens.

Tear strength: a Graves tear test, DIN 53 515, was carried out on stamped-out strips with V-shaped nicks.

Shore hardness: the Shore hardness according to DIN 53 505 was determined using test apparatus D and A.

Heat deflection temperature: determined according to DIN 53 461 as Vicat number using measurement method A.

The formulations of the films which were produced, and the test results, are shown in Table 3.

TABLE 3

| Test No. | 1V*) | 2 | 3 |
|---|---|---|---|
| Formulation [% by weight]: | | | |
| A | 80 | 80 | 70 |
| B | 10 | 10 | 15 |
| C | — | 10 | 15 |
| C* | 10 | — | — |
| Properties | | | |
| Tensile strength [N/mm²] | 14 | 17 | 20 |
| Elongation at break [%] | 140 | 170 | 176 |
| Shore Hardness A | 93 | 87 | 88 |
| Shore Hardness D | 47 | 44 | 47 |
| Tear strength [N/mm²] | 46 | 51 | 52 |
| Heat deflection temperature: Vicat A 50 [° C] | 89 | 86 | 90 |

*) for comparison

Films produced from molding compositions comprising a hydrogenated polymer C*) (butadiene-containing block with progression styrene-poor to styrene-rich, joined to a homopolystyrene block) in place of the polymer C) of the invention have a considerably lower elongation at break and a significantly lower tear strength (test 1V). In addition, these films are more rigid.

In contrast, films comprising the polymer C) of the invention (polystyrene block—3 random polymer blocks of styrene and hydrogenated butadiene—polystyrene block) combine good tensile strength, high elongation at break, good tear strength, low rigidity and high heat deflection temperature (tests 2 and 3).

We claim:

1. A thermoplastic molding composition comprising
A) from 30 to 98% by weight of a graft copolymer comprising
$a_K$) from 30 to 90% by weight of an elastomeric graft core, obtained by copolymerization of
$a_K/1$) from 80 to 99.99% by weight of one or more $C_1$–$C_{10}$-alkyl acrylates,
$a_K/2$) from 0.01 to 20% by weight of a monomer with crosslinking effect, and
$a_K/3$) from 0 to 40% by weight of one or more other monomers,
$a_S$) from 10 to 70% by weight of a graft shell comprising
$a_S/1$) from 50 to 100% by weight of a styrene compound of the formula

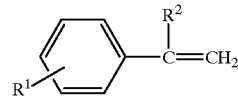

where $R^1$ and $R^2$ are hydrogen or $C_1$–$C_8$-alkyl, or a $C_1$–$C_8$-alkyl acrylate or methacrylate, or a mixture of the styrene compound and the $C_1$–$C_8$-alkyl acrylate or methacrylate, and
$a_S/2$) from 0 to 50% by weight of one or more other monomers,
B) from 1 to 50% by weight of a thermoplastic polymer comprising
$b_1$) from 50 to 100% by weight of styrene or α-methylstyrene or mixtures of these
$b_2$) from 0 to 50% by weight of acrylonitrile, and b₃) from 0 to 50% by weight of one or more other monomers, and C) from 1 to 70% by weight of an elastomeric block copolymer prepared by anionic polymerization of the monomers with addition of a potassium compound soluble in non-polar solvents (Step 1)

followed by hydrogenation of all or virtually all the olefinic double bonds of the polymer obtained in Step 1) (Step 2), which essentially consists of at least one block A, which forms a hard phase and contains, in its polymer chain, units of a vinylaromatic monomer, or a block B, which forms a first elastomeric (soft) phase and contains diene monomers, or block A and block B, and at least one elastomeric block B/A, which forms a (if appropriate second or further) soft phase, and contains, randomly in its polymer chain, units of both a vinylaromatic monomer and a diene, where the glass transition temperature $T_g$ of the block A is above 25° C. and that of the block B/A, before hydrogenation, is below 25° C. and the phase-volume ratio of block A to block B/A is chosen so that the proportion of the hard phase in the entire block copolymer is from 1 to 40% by volume and the proportion by weight of the diene is less than 50% by weight.

2. A thermoplastic molding composition as claimed in claim 1, wherein the potassium compound for preparing component C) is a potassium salt of a tertiary alcohol with at least 7 carbon atoms.

3. A thermoplastic molding composition as claimed in claim 2, wherein the tertiary alcohol is 3-ethyl-3-pentanol, 2,3-dimethyl-3-pentanol or 3,7-dimethyl-3-octanol.

4. A thermoplastic molding composition as claimed in claim 1, wherein an alkyllithium compound is added besides the potassium compound in preparing component C).

5. A thermoplastic molding composition as claimed in any of claim 1, wherein component C) has a proportion of 1,2-diene linkages of from 8 to 15%, based on the total of 1,2- and 1,4-diene linkages.

6. A thermoplastic molding composition as claimed in claim 1, wherein the potassium compound is added for the anionic polymerization of the soft phases (blocks B and B/A).

7. A thermoplastic molding composition as claimed in claim 1, wherein, during the anionic polymerization in step 1) for preparing component C), the alkyllithium compound is added first, followed by the potassium compound.

8. A thermoplastic molding composition as claimed in claim 1, wherein, in the block copolymer C), the $T_g$ of the hard phase (block A) is above 50° C. and the $T_g$ of the soft phases (blocks B and B/A) is below 5° C. before hydrogenation.

9. A thermoplastic molding composition as claimed in any of claim 1, wherein, in the block copolymer C), the vinylaromatic monomer is selected from the group consisting of styrene, α-methylstyrene, vinyltoluene and mixtures of these, and the diene is selected from the group consisting of butadiene, isoprene and mixtures of these.

10. A thermoplastic molding composition as claimed in any of claim 1, wherein, in the block copolymer C), the (if appropriate second or further) soft phase (block B/A) is formed from a copolymer of a vinylaromatic with a diene.

11. A thermoplastic molding composition as claimed in claim 1, wherein the hydrogenated block copolymer C) is constructed according to the formula $(A-B/A)_n-A$, where A is the vinylaromatic block, B/A is the block constructed randomly from diene and vinylaromatic units, and n is an integer from 1 to 10.

12. A thermoplastic molding composition as claimed in claim 1, in which the soft phase (block B/A) of the hydrogenated block copolymer C) is subdivided into the blocks $(B/A)_1-(B/A)_2$ (1)

$(B/A)_1-(B/A)_2-(B/A)_1$ (2)

$(B/A)_1-(B/A)_2-(B/A)_3$ (3)

whose vinylaromatic/diene ratio is different in the individual blocks B/A or varies continuously within a single block within the limits $(B/A)_1 - (B/A)_3$ where the glass transition temperature $T_g$ of each sub-block is below 25° C.

13. A thermoplastic molding composition as claimed in claim 1, wherein the hydrogenated block copolymer C) is constructed according to the formula

A–B/A–A, where A is the vinylatomatic block, and B/A is the block constructed randomly from diene and vinylaromatic units.

14. A thermoplastic molding composition as claimed in claim 1, wherein component B) is a copolymer of from 60 to 95% by weight of styrene and from 5 to 40% by weight of acrylonitrile.

15. A film or shaped article made from a thermoplastic molding composition as claimed in claim 1.

16. A film or shaped article as claimed in claim 15 adapted for the internal decoration of automobiles.

* * * * *

UNITED STATES PATENT AND TRADEMARK OFFICE
CERTIFICATE OF CORRECTION

PATENT NO. : 6,162,867
DATED : December 19, 2000
INVENTOR(S) : Guentherberg et al.

Page 1 of 1

It is certified that error appears in the above-identified patent and that said Letters Patent is hereby corrected as shown below:

Column 17, claim 5,
Lines 41-42, delete "any of".

Column 17, claim 7,
Line 50, "claim 1" should be -- claim 4 --.

Column 18, claim 9,
Line 455, delete "any of".

Column 18, claim 10,
Lines 10-11, delete "any of".

Column 18, claim 12,
Line 34, "-+" should be -- → --.

Column 18, claim 13,
Line 42, "vinylatomatic" should be -- vinylaromatic --.

Signed and Sealed this

Twenty-fifth Day of September, 2001

*Attest:*

*Nicholas P. Godici*

*Attesting Officer*

NICHOLAS P. GODICI
*Acting Director of the United States Patent and Trademark Office*